Patented Dec. 5, 1939

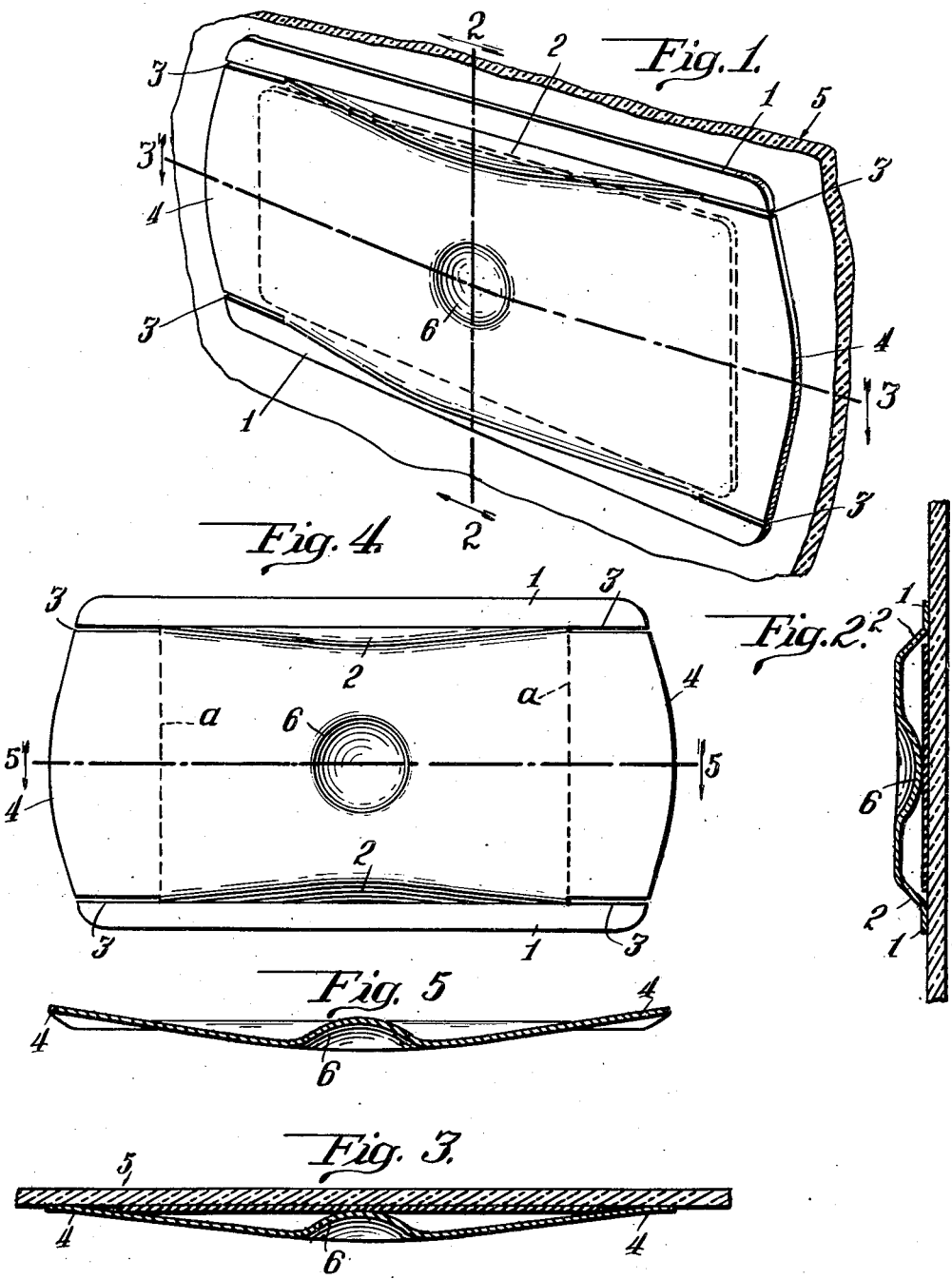

2,181,976

UNITED STATES PATENT OFFICE 2,181,976

CARD OR CERTIFICATE RECEPTACLE

Rudolph W. Lotz, Chicago, Ill., assignor of five-tenths to Herman H. Panama and one-tenth to Edward Frieder, both of Chicago, Ill., and four-tenths to Samual Ungerleider, New York, N. Y.

Application April 18, 1938, Serial No. 202,661

6 Claims. (Cl. 40—10)

The present invention has for its general object to provide a novel receptacle for a card or certificate, such as an identification card or certificate of ownership of an automotive vehicle or the like, or for other similar purposes, which is adapted to be mounted upon the windshield of an automotive vehicle or upon any other pane of glass, or the like, through which the card, certificate, license or other means of identification is to be rendered visible, the essential object of the invention being to provide a device of this character which, after being mounted upon the windshield or other surface, is both water and dust-proof, and occupies a very small area, and which, preferably, is transparent so as to provide the neatest possible appearance when mounted in place and obstructs as small a surface of the glass as possible.

A further object of the invention is to provide a device of the character above described which is composed of a single piece of suitable material and in its complete form presents a plurality of points of engagement between a contained card, or the like, and parts of the device for maintaining the card, or the like, in close contact with the surface upon which the device is mounted.

Another object of the invention is to provide a device of this character which will permit relatively easy insertion and removal of a card, or the like, and which is self-sealing following the insertion or removal of the contents thereof.

A suitable embodiment of the invention is illustrated in the accompanying drawing, wherein, Fig. 1 is a perspective view of a device constituting a suitable embodiment of the invention, showing the same mounted upon a windshield, or the like, the latter being shown in fragment.

Fig. 2 is a vertical transverse sectional view of the device taken on the line 2—2 of Fig. 1.

Fig. 3 is a plan sectional view of the device taken on the line 3—3 of Fig. 1.

Fig. 4 is a view in front elevation of the device of Fig. 1 in the condition in which it is found before mounting the same upon the glass pane.

Fig. 5 is a plan sectional view of the same on the line 5—5 of Fig. 4.

Referring first to Figs. 4 and 5, the device of the present invention is shown as composed of a single piece of appreciably resilient sheet material which presents parallel flanges 1 along its upper and lower edges to which a suitable cement is applied for securing the said device to the windshield or other surface. The middle portion of the device is dished or bulged away from the surface of the flanges adapted to receive the coating of cement, as shown at 2 in the several figures of the drawing. The dishing or bulging of the middle portion of the device is such that the portion thereof midway between the ends of the holder is of greatest depth at the middle and decreases in depth as it approaches the ends of the device so as to disappear at points spaced inwardly from said ends as indicated by the dotted lines (a), the said dished or bulged portion thus being of a substantially very shallow V-shape in plan section as shown in Figs. 3 and 4.

Shear cuts 3 represented by the longitudinal slots so designated, are cut into the ends of the device along the inner edges of the flanges 1 thereof and terminate, preferably, at said dotted lines (a). The end portions between the end extremities of the device and the inner ends of the said shear cuts 3 are flat and flush with the end portions of the flanges 1 bordering the same over the entire width of the end portions of said device, the length of the shear cuts or slots 3 being such that the inner ends thereof practically meet the ends of the dished or bulged portion 2 of the device along said dotted lines (a). The end portions 4 of the device between the shear cuts 3 constitute digitally manipulable resilient flanges which may be flexed outwardly from the surface of the glass which they hug normally for effecting insertion and removal of the card or the like.

The middle bulged or dished portion 2 is preferably of a length slightly less than the length of the card, or the like, which is intended to be inserted into the device, so that when the card is disposed within the said device, its outermost ends will be engaged by the innermost end portions of the flanges 4 for maintaining said card in close contact with the surface of the glass pane 5, or other surface, to which the device is secured.

In the center of the bulged or dished portion 2, I provide by means of embossing, a dished portion 6 which projects inwardly toward the glass pane or surface 5 and which is maintained normally in contact therewith and thus is caused to bear yieldingly upon the middle portion of the card which may be inserted into the receptacle.

The said device is adapted to be made of transparent Celluloid possessing an appreciable degree of resiliency. Said material is very easily formed or shaped in a well known manner, somewhat similar to the same operations pertaining to the manufacture of sheet metal articles.

As shown in Fig. 5, the flanges 4 of the device normally project beyond the cement carrying faces of the side flanges 1 before the device is mounted upon the surface aforesaid, so that when so mounted, the said flanges 4 are flexed to lie flush with the flanges 1 and will bear normally against the opposed surface of the glass, or the like, upon which the device is mounted with the same action as is incident to a very light flat spring.

Obviously, in the event that either of the flanges 4 is flexed away from the surface opposed thereto, a card, or the like, may be readily pushed into the container through the open space thus provided and after said card is disposed within the container, the release of the outwardly flexed flange 4 causes the same to resume its normal position and effects a self-sealing of the device along shear cuts or slots 3, thus rendering the device water-proof and dust-proof. The insertion of the card is effected against some degree of resistance occurring substantially along the dotted lines (a).

Obviously, the device acts also as an insulator to prevent frosting or sweating of the surface of the glass covered by the same. The device permits washing of the surface to which it is applied without danger of seepage of water into the card confining space.

To remove the card or contents of the device, the flanges 4 may be flexed out of contact with the surface opposed thereto and another card may be inserted and engaged with the opposed end of the contained card for forcing the same to project from the opposite end of the holder to present a digitably engageable end portion for effecting complete removal of the card. The latter may then be re-inserted or replaced by another card.

While the use of a transparent resilient material for the manufacture of the device is preferable to other materials, the said device may be made of sheet metal or any other material adapted for its manufacture.

I claim as my invention:

1. The combination with a flat surfaced element such as the windshield of an automotive vehicle, of a main wall of resilient material spaced from and opposed to said element, said wall equipped with a pair of parallel flanges along two sides thereof secured to said element, said wall and flanges cooperating with said element to provide a receptacle for a card or the like, there being slits separating end portions of said wall from end portions of said flanges, the portions of said wall bordered by said slits constituting resilient tongues converging at their outer end portions toward and into contact with and bearing yieldingly upon said element and constituting closures for the ends of said receptacle, said tongues being digitally manipulable for the insertion and removal of objects into and from said receptacle respectively.

2. The combination with a flat surfaced element, such as the windshield of an automotive vehicle, of a bowed wall of a resilient material opposed to said element and equipped along two parallel side edges with substantially L-shaped flanges rigidly secured to said element, the latter and said wall and flanges cooperating with each other to provide a receptacle of greatest depth at its middle portion and open at its ends, said wall terminating at its ends in resilient tongues converging toward and bearing yieldingly at their outer end portions against said element for maintaining said receptacle normally closed, said tongues being digitally manipulable to open said receptacle for insertion and removal of a card of the like and constituting spring elements for yieldingly clamping an end portion of an inserted card against said element.

3. A structure comprising a flat surfaced element, such as a window pane, constituting one wall of a receptacle for a card or the like, a shallow box-like member comprising a main wall opposed to and spaced from said element and equipped along the edges thereof with flanges secured at their outer ends to said element for cooperation therewith to provide a receptacle, said main wall terminating at its ends in resilient, digitally manipulable tongues normally bearing upon said element at their outer end portions and constituting self-restoring closures for said receptacle, the said tongues being free of said flanges.

4. A structure comprising a flat surfaced element, such as a window pane, constituting one wall of a receptacle for a card or the like, a shallow box-like member comprising a main wall opposed to and spaced from said element and equipped along the edges thereof with flanges secured at their outer ends to said element for cooperation therewith to provide a receptacle, said main wall terminating at its ends in resilient, digitally manipulable tongues normally bearing upon said element at their outer end portions and constituting self-restoring closures for said receptacle, the said tongues being free of said flanges and projecting beyond the ends of the latter.

5. A structure comprising a flat surfaced element, such as a window pane, constituting one wall of a receptacle for a card or the like, a shallow box-like member comprising a main wall opposed to and spaced from said element and equipped along the edges thereof with flanges secured at their outer ends to said element for cooperation therewith to provide a receptacle, said main wall terminating at its ends in resilient, digitally manipulable tongues normally bearing upon said element at their outer end portions and constituting self-restoring closures for said receptacle, the inner end portions of said tongues being cut free of said flanges along end portions of the latter.

6. A structure comprising a flat surfaced element, such as a window pane, constituting one wall of a receptacle for a card or the like, a shallow box-like member comprising a main wall opposed to and spaced from said element and equipped along the edges thereof with flanges secured at their outer ends to said element for cooperation therewith to provide a receptacle, said main wall terminating at its ends in resilient, digitally manipulable tongues normally bearing upon said element at their outer end portions and constituting self-restoring closures for said receptacle, the said tongues being free of said flanges and projecting beyond the ends of the latter, the inner end portions of said tongues being cut free of said flanges along end portions of the latter.

RUDOLPH WM. LOTZ.